United States Patent [19]
Lequesne et al.

[11] Patent Number: 5,668,471
[45] Date of Patent: Sep. 16, 1997

[54] ROTATIONAL SENSOR WITH ROBUST AXIAL ALIGNMENT TOLERANCE

[75] Inventors: Bruno Patrice Bernard Lequesne, Troy; Thaddeus Schroeder, Rochester Hills, both of Mich.

[73] Assignee: General Motors Corporation, Detroit, Mich.

[21] Appl. No.: 578,305

[22] Filed: Dec. 26, 1995

[51] Int. Cl.$^6$ .............................. G01B 7/30; G01B 7/14; G01D 5/12

[52] U.S. Cl. .......................... 324/207.21; 324/207.25; 123/414

[58] Field of Search ........................... 324/207.2, 207.21, 324/207.25, 207.22; 123/414, 612, 617

[56] References Cited

U.S. PATENT DOCUMENTS

| | | | |
|---|---|---|---|
| 4,926,122 | 5/1990 | Schroeder et al. | 324/207.13 |
| 5,469,055 | 11/1995 | Mueller et al. | 324/207.21 |

Primary Examiner—Walter E. Snow
Attorney, Agent, or Firm—Vincent A. Cichosz

[57] ABSTRACT

A rotation sensor for high accuracy angle applications such as internal combustion engine crankshaft position sensing includes a pair of complementary target wheels and a dual-element magnetoresistive sensor. The target wheels are spaced from one another along the rotational axis by a predetermined distance. The individual magnetoresistive elements are similarly spaced one from the other and are influence by the ferrite effects of the target wheels. The spacing of the target wheels and magnetoresistive elements are selected in relation to one another and in relation to the mount of axial play in the crankshaft such that changes in ferrite effects of the target wheels upon the elements due to axial displacements of the crankshaft have minimal effect on the accuracy of the sensing apparatus.

5 Claims, 4 Drawing Sheets

ROTATIONAL SENSOR WITH ROBUST AXIAL ALIGNMENT TOLERANCE

BACKGROUND

The present invention is related to rotation sensing apparatus. More particularly, the invention is directed toward a high accuracy, dual-track target wheel rotational sensor.

High accuracy rotational sensors are known which utilize dual-track target wheels and a dual-element sensor. Each section of such a target wheel is axially adjacent the other along the rotational axis thereof, and each section has disposed radially adjacent thereto one of the two elements. Such target wheel arrangements are particularly advantageous when employed, for example, as part of a rotating member such as an internal combustion engine crankshaft for determining angular position information therefor. A known target wheel for such a sensor arrangement includes substantially complementary, or mirror image, geometries. That is to say, a tooth location on one section is adjacent a slot on the other section. Output signals from the two elements are complementary and provide for high accuracy tooth edge detection with relatively simple differential signal processing. An example of such a sensor apparatus may be found in U.S. patent application Ser. No. 08/262,097, filed Jun. 20, 1994, assigned to the assignee of the present invention.

Referring to FIGS. 1A and 1B, related rotational sensor arrangements are shown being viewed from a substantially tangential vantage point with respect to a rotating member. In each Figure, a dual-element magnetoresitive sensor is generally labeled 11 and comprises individual magnetoresistive elements MR1 and MR2, and a bias magnet 13. Although not separately illustrated, a ferromagnetic shim may be located between the bias magnet 13 and the individual MR elements. The MR sensors are generally balanced having positively correlated, magnitudinal equivalence such that equivalent flux density through each individual element produces a substantially equivalent MR response. Such dual-element MR sensors are generally well known, an exemplary one of such sensors being found in U.S. Pat. No. 4,926,122 also assigned to the assignee of the present invention. Also in each Figure, a rotational axis is labeled (Ar) and corresponds to an axis of rotation of a member (not illustrated) such as an engine crankshaft. Coupled to the rotating member is a target wheel 15 forming a pair of immediately adjacent tracks, one track on each respective side of plane 'P' which is orthogonal to the axis of rotation and which hence appears as a line in the Figure separating left and right portions of the receptive views. Each target wheel 15 is characterized by teeth on each section generally axially adjacent to discontinuities on the other section save perhaps for small, axially-adjacent, discontinuous sections at the angular interfaces between teeth on opposite axial sides of the target wheel. Examples of such target wheels are described in the aforementioned co-pending U.S. patent application Ser. No. 08/262,097.

In each FIG. 1A and 1B, the target wheels 15 are illustrated in a rotational position (solid line) whereat a tooth and a discontinuity toward the left and the right of the plane P, respectively, are axially aligned beneath the respective MR sensor. Alternatively, another rotational position is exemplified by the broken line whereat a tooth and a discontinuity toward the right and the left of the plane P, respectively, are axially aligned beneath the MR sensor. As the target wheel rotates, these two positions essentially alternate thus producing substantially angle-coincident inverse resistive changes to the individual MR elements which are sensed and processed to produce an angle indicative signal. Generally, this is accomplished with differential signal processing or comparator means, one such exemplary sensing and processing means being disclosed in the aforementioned co-pending U.S. patent application Ser. No. 08/262,097.

In all applications, a certain degree of axial movement of the rotating member relative to the sensor will occur. Accommodation of such axial movement is required in order to minimize the angular inaccuracy in minor cases and to ensure operativeness of the sensor in extreme case. Such accommodation has been accomplished through widening each track of the target wheel and/or widening the axial spacing between the two sensing elements to ensure acceptable levels of performance. Of course, space and placement limitations may greatly restrict the degree to which such accommodations may be implemented.

The two views of related sensors in FIGS. 1A and 1B generally graphically describe conventional management of axial play affecting the MR sensor outputs. FIGS. 2A thru 2C, illustrating individual MR element outputs and angular information derived therefrom, will also be referred to herein in exposition of the management of axial play illustrated in and described with respect to FIG. 1A and 1B. In each FIG. 1A and 1B, it is understood that the respective MR sensor is mounted net to a major body; in the case of the exemplary application of crankshaft sensing, the engine block provides the preferred mounting provision. Therefore, any axial movement of the rotating member, the engine crankshaft in the example at hand, is therefore with respect to the engine block and MR sensor. The preferred sensor/target wheel alignment is one wherein the centerline 16 located mid-way between individual MR elements MR1 and MR2 corresponds to the interface or plane P between the two tracks of the target wheel. Such relative positioning preferably corresponds to the position of the crankshaft at the center of its axial tolerance. In other words, assuming a total axial tolerance for movement of $\Delta$, alignment of the crankshaft as described would allow maximum movement to either side of the sensor centerline 16 of substantially $\Delta/2$. In each FIG. 1A and 1B, an mount of axial displacement of $\delta$ is illustrated wherein $\delta \leq \Delta 2$.

Desired sensor performance is accomplished in either of the arrangements of FIGS. 1A and 1B when the MR sensor elements are symmetrically aligned over the target wheel such as previously described. Sensor response with such ideal alignment is represented in FIG. 2A wherein the respective MR elements produce outputs having inverse symmetry with the respective outputs intersecting at the desired rotation angle $\theta$net.

Generally, the width of the target wheel is application specific and established with such considerations as mechanical strength and available location and space on the crankshaft. For axial tolerances that are relatively small with respect to an available width of the target wheel as illustrated in FIG. 1A, and further assuming that in that Figure $\delta = \Delta/2$ such that the axial displacement is illustrated at a maximum or worst case, the axial spacing between MR1 and MR2 ensures that for all axial displacements the MR elements remain over respective tracks. However, even with such provision, MR outputs would vary from ideal substantially as shown in FIG. 2B. An examination of the outputs exposes a shift in the level of the output of MR2 when located over a respective discontinuity due to ferrite effects from the adjacent track moth. A resultant shift in the intersection of the respective outputs occurs at rotation angle $\theta\delta$. Therefore, the sensor angular error is substantially $\pm(\theta net - \theta\delta)$.

For axial tolerances that are relatively large with respect to an available width of the target wheel as illustrated in FIG. 1B, and continuing with the assumption that $\delta=\Delta/2$ such that the axial displacement is illustrated at a maximum or worst case, the axial spacing between MR1 and MR2 is relatively wide to provide adequate peak to peak output and a maximum axial displacement operating band. Closer placement would result in increased adjacent track ferrite effects and less tolerance to smaller axial displacements. However, even with such provision, substantial angular error would result due to shifting of the outputs intersection and potentially loss of intersection where, as illustrated, the axial deviation is so great as to place one MR element (MR2) closer to a tooth of the adjacent track than the other MR element (MR1) is to that same tooth. In this case, MR outputs would vary from ideal substantially as shown in FIG. 2C and result in total loss of an angular position signal since such is, as described, a result of differential processing of the MR outputs.

SUMMARY

Therefore, in accordance with a first general aspect of the present invention, a dual-track, dual-element rotational sensor is provided which ensures MR outputs for yielding angular position information over a predetermined range of axial displacements of a rotating member, and preferably over the entire range of axial displacement. In accordance with a second general aspect of the present invention, the dual-track, dual-element rotational sensor substantially eliminates sensor angular errors characteristic of axial displacements in related sensors.

The first general aspect is provided for by a sensor arrangement having a pair of tracks, each one of which is characterized by circumferentially alternating high and low permeability areas such as is characteristic of a toothed wheel arrangement. The two tracks are arranged relative to each other such that the high permeability areas of one track are axially aligned with the low permeability areas of the other track at all angular positions thereabout. The two tracks are separated by a predetermined axial distance which, in concert with the separation between the individual MR elements and known axial deviation tolerance of the rotating member, ensures MR outputs for yielding angular position information by ensuring that the ferrite effects of the track corresponding to a particular MR element dominates any ferrite effect the same track may impose upon the other MR element.

The second general aspect is provided for by a sensor arrangement having a pair of tracks, each one of which is characterized by circumferentially alternating high and low permeability areas such as is characteristic of a toothed wheel arrangement. The two tracks are arranged relative to each other such that the high permeability areas of one track are axially aligned with the low permeability areas of the other track at all angular positions thereabout. The two tracks are separated by a predetermined axial distance which, in concert with the separation between the individual MR elements and known axial deviation tolerance of the rotating member, ensures angle invariant intersection of MR outputs for yielding angular position information by ensuring that the ferrite effects of the track corresponding to a particular MR element is substantially equivalent to the ferrite effects of the other track corresponding to the other particular MR element.

BRIEF DESCRIPTION OF THE DRAWINGS

The present invention will now be described, by way of example, with reference to the accompanying drawings, in which.

DETAILED DESCRIPTION

Figure 1A:
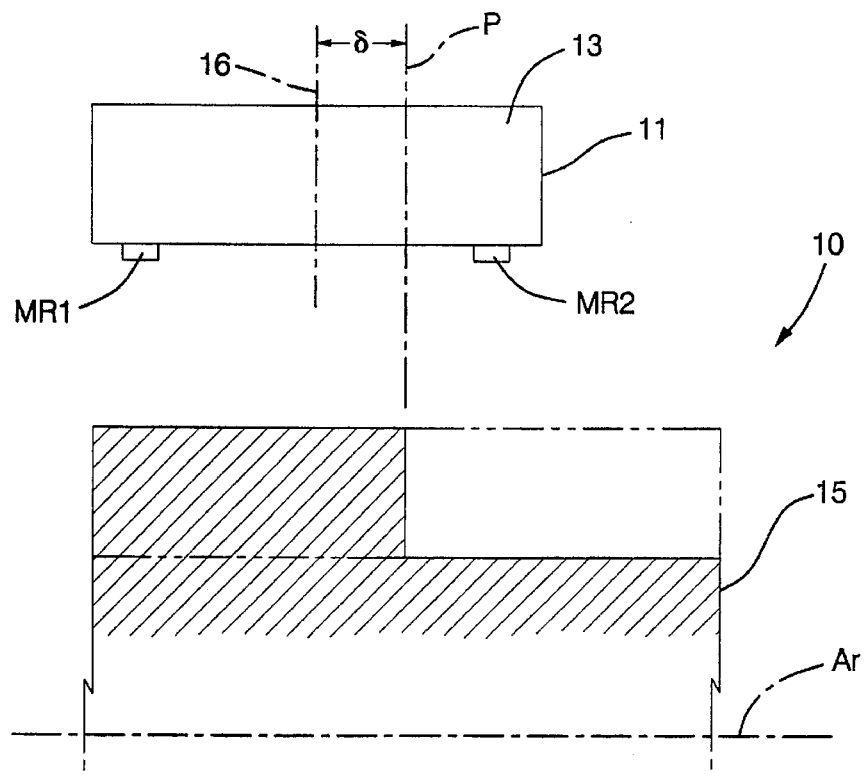
FIGS. 1A and 1B are views of a rotational sensor including a dual-element magnetoresistive sensor and dual track target wheels demonstrative of the variety of rotation sensors to which the present invention is concerned.
Figure 1B:
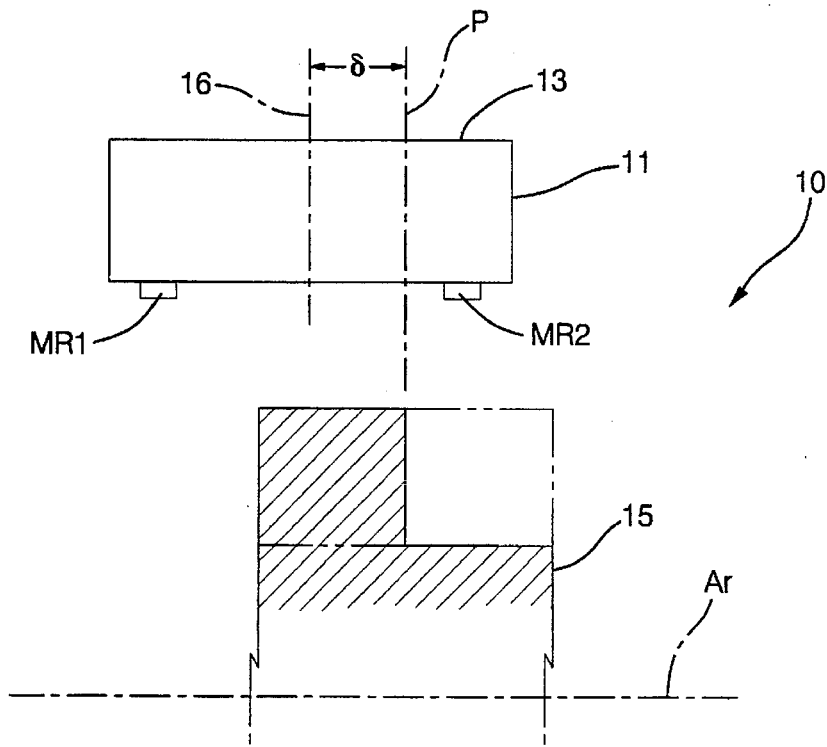
Figure 2A:
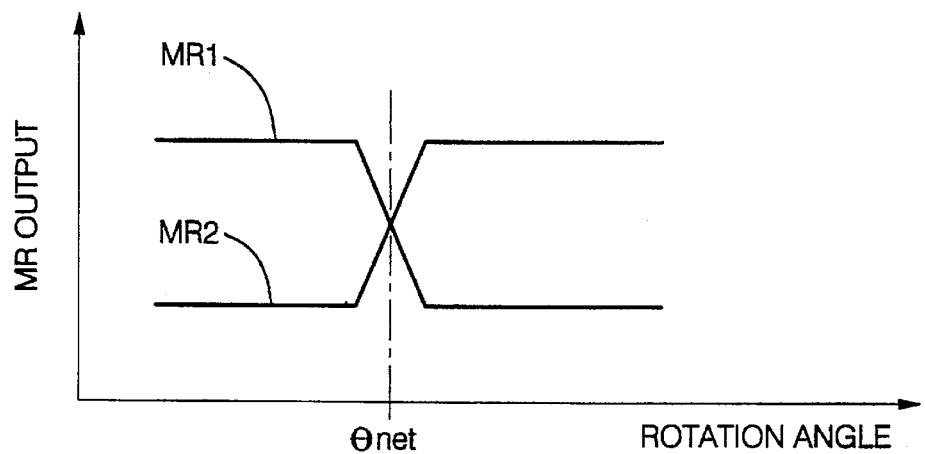
FIGS. 2A–2C are plots of various outputs of the dual element magnetoresistive sensor cooperating with the dual track target wheel geometries as illustrated in FIG. 1.
Figure 2B:
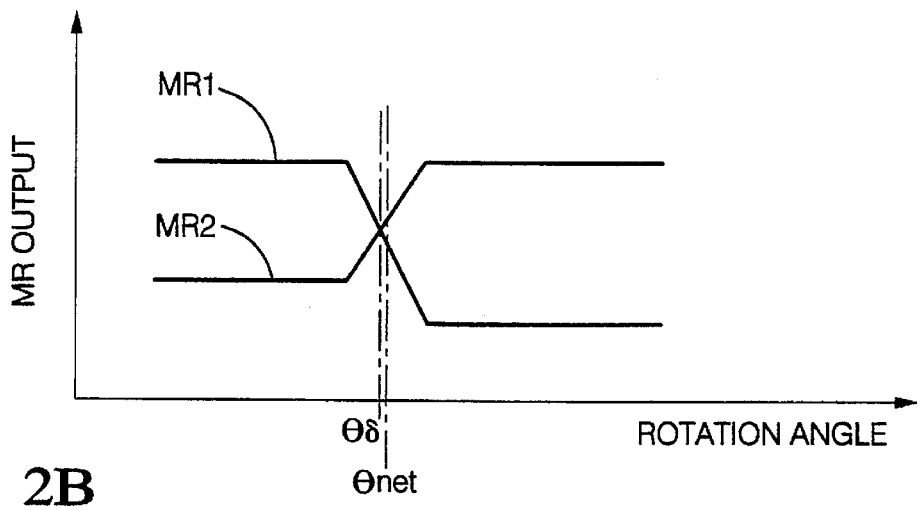
Figure 2C:
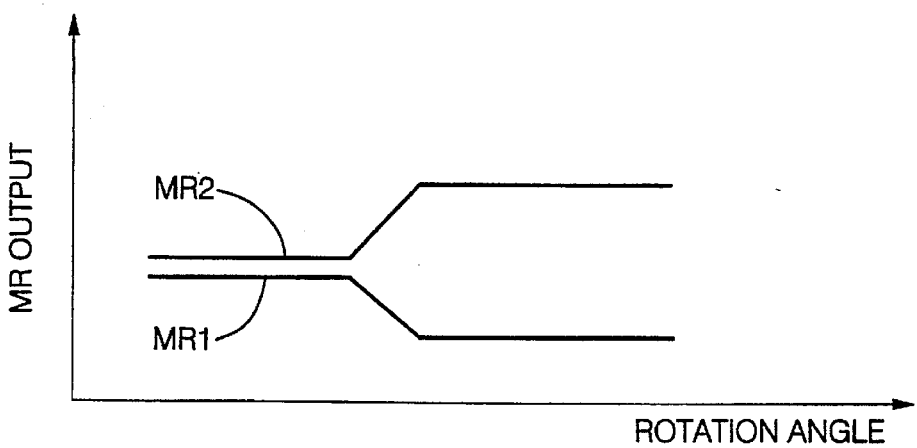
Figure 3:
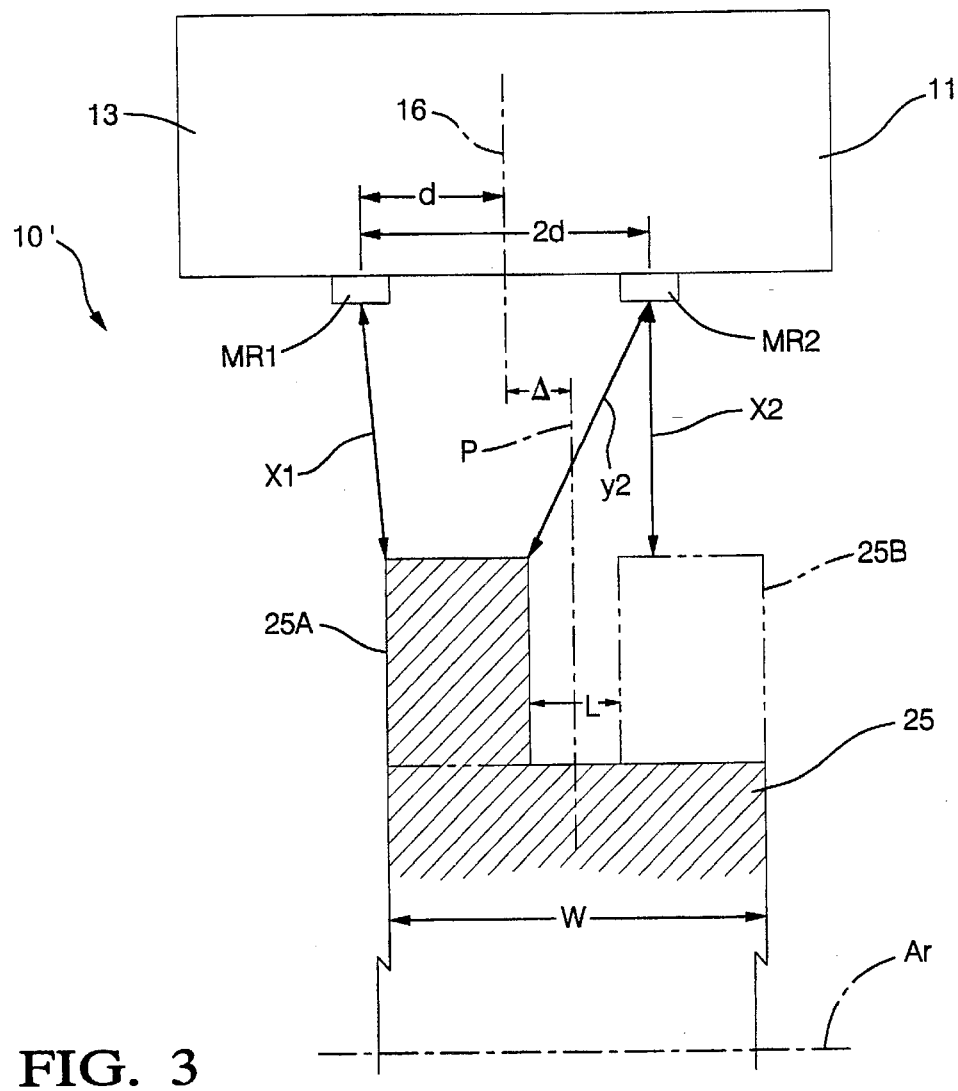
FIG. 3 is a view of a first embodiment of a rotational sensor including a first dual track target wheel geometry.

With reference now to FIG. 3 and the description to follow, it is noted that the general relationships between the various described components of a rotation sensor are identical to those described in reference to the related art sensors of FIG. 1A and 1B. In other words, the sensor is net mounted to an engine block, the target wheel is net mounted to the engine crankshaft, and the engine crankshaft has a predetermined mount of axial play relative to the engine block and sensor. A rotation sensor in accord with a first embodiment of the present invention is generally designated 10' and includes a dual-element magnetoresistive (MR) sensor generally designated 11 cooperating with a rotating dual-track, target wheel generally designated 25. The rotation of the crankshaft, and hence the rotation of the target wheel, occurs about the rotational axis (Ar). The dual-element MR sensor 11 includes individual MR elements labeled MR1 and MR2 and a bias magnet 13. The individual MR elements are seen to be symmetrically spaced on opposite axial sides of center line 16, each MR element spaced a distance (d) from the centerline 16 with a total distance 2d between the two MR elements.

Target wheel 25 defines two tracks not separately labeled but generally understood to correspond to respective peripheral areas of alternating high and low permeability on each side of plane P. In the present illustrated embodiment, reference is made to a single target wheel; however, it is to be understood that any such target wheel 25 comprises a pair of target wheels 25A and 25B which may be physically distinct or parts of a unitary structure as illustrated. Reference may be made to both target wheels 25A and 25B together as target wheel 25 or individually as target wheel 25A or 25B. Symmetry of the target wheel 25 and track structure about the plane P is assumed. The width of the target wheel 25, or distance between respective axially opposite side edges of two target wheels 25A and 25B, is designated (W). The teeth of one target wheel 25A or 25B are separated from the teeth of the other target wheel 25A or 25B by an axial distance designated (L), again symmetrically about the plane P.

As between the sensor 13 and target wheel 25, the target wheel is illustrated at the maximum axial deviation $\Delta$ to one side of the centerline 16 of the sensor 13. Although discussion to follow is concerned only with the deviation as generally illustrated, deviation to the opposite side is equally applicable to the general principles described. The distance between MR1 and the closest surface point of a tooth of the corresponding track when radially aligned with the sensor is designated $x_1$, and similarly the distance between MR2 and the closest surface point of a tooth of the corresponding track when radially aligned with the sensor is designated $x_2$. The distance between MR2 and the closest surface point of a tooth of the track corresponding to MR1 when radially aligned with the sensor is designated $y_2$.

The rotation sensor 10' as illustrated provides for accommodation of even the maximum axial deviation of the crankshaft and target wheel to ensure operativeness of the sensor at all axial deviations. That is to say, the intersection of respective MR outputs is ensured by selectively choosing the various dimensions described such that when a tooth of the corresponding track is radially aligned with the sensor each MR element provides an MR output that is greater than the coincident MR output of the other MR sensor. In order that this be accomplished, the distance designated $x_1$ must be less than the distance designated $y_2$, or $x_1 < y_2$. This ensures MR output intersection and consequently angular information by way of differential signal processing as described.

Therefore, a first relationship to be considered is that between the distance d from sensor centerline to MR element and maximum axial deviation A. Assuming a relationship wherein $d \leq \Delta$, the distance L must be greater than twice the difference between the maximum axial deviation $\Delta$ and the distance d from sensor centerline to MR element, or $L > 2*(\Delta - d)$, and (a) the width of the target wheel W then must be greater than twice the summation of the maximum axial deviation $\Delta$ and the distance d from sensor centerline to MR element, or $W > 2*(\Delta + d)$, or (b) the distance L must be greater than four times the maximum axial deviation $\Delta$ less the width of the target wheel W, or $L > 4\Delta - W$. Where condition (a) has been met, condition (b) necessarily follows; however, where condition (b) is met, condition (a) may or may not be met. If on the other hand $d > \Delta$, the distance L must be greater than four times the maximum axial deviation $\Delta$ less the width of the target wheel (distance between respective axially opposite side edges) W, or $L > 4\Delta - W$.

Figure 4:
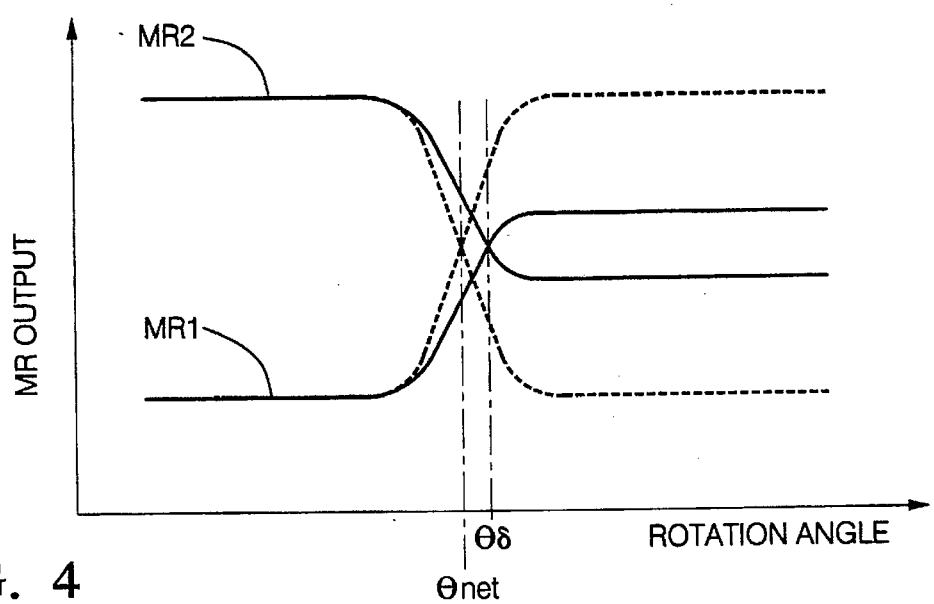
FIG. 4 is a plot of the outputs of the dual element magnetoresistive sensor cooperating with the dual track target wheel geometry as illustrated in FIG. 3.

With a sensor meeting the geometrical limitations set forth above to ensure the intersection of MR outputs, the actual angle of intersection will occur at some angle which varies with the actual axial displacement δ. In the illustration of FIG. 3, the actual axial displacement δ is equal to the maximum axial displacement $\Delta$ and the geometry is such that $d > \Delta$. Thus for the general geometry and direction of axial displacement as shown in FIG. 3, the actual intersection angle θδ relative to the desired angle θnet is as shown in FIG. 4. Axial deviation to the opposite side oft he sensor centerline will of course shift the actual intersection angle θδ to the left the desired angle θnet in similar fashion. An examination of the FIGS. 3 and 4 yields an understanding that the distance $x_1$ increases when the axial displacement begins to move MR1 beyond the edge of respective track. As such, the MR1 high peak output is at a relative minimum (solid trace) when the axial displacement, and thus the distance $x_1$, is at a maximum. For axial displacements which minimize the distance $x_1$, i.e. those which do not move MR1 beyond the edge of the respective track, the MR1 high peak output approaches a relative maximum (broken trace). Similarly, the MR2 low peak output is at a relative maximum (solid trace) when the axial displacement is at a maximum and thus the distance $y_2$ is at a minimum. For axial displacements at which the ferrite effects of the track corresponding to MR1 are negligible upon MR2, i.e. those further toward the right in the Figure, the MR2 low peak output approaches a relative minimum (broken trace).

Figure 5A:
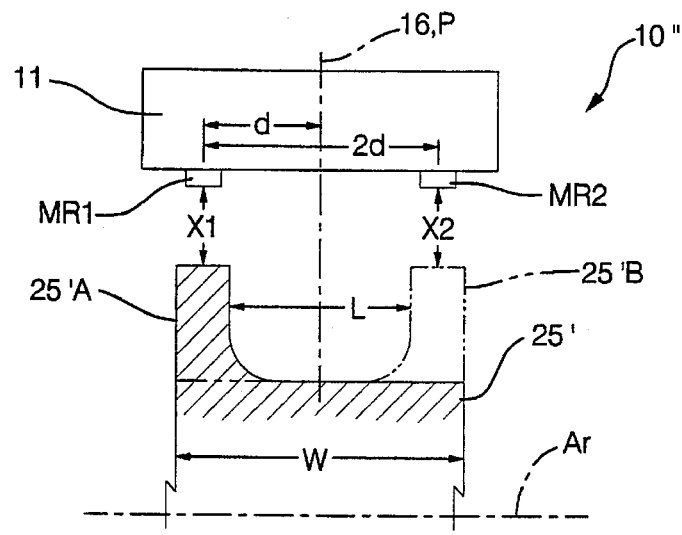
FIGS. 5A and 5B are views of a second embodiment of a rotational sensor, including a second dual track target wheel geometry, at the net and a maximum axial tolerance, respectively; and, FIG. 6 is a plot of the outputs of the dual-element magnetoresistive sensor cooperating with the dual track target wheel geometry as illustrated in FIGS. 5A and 5B.
Figure 5B:
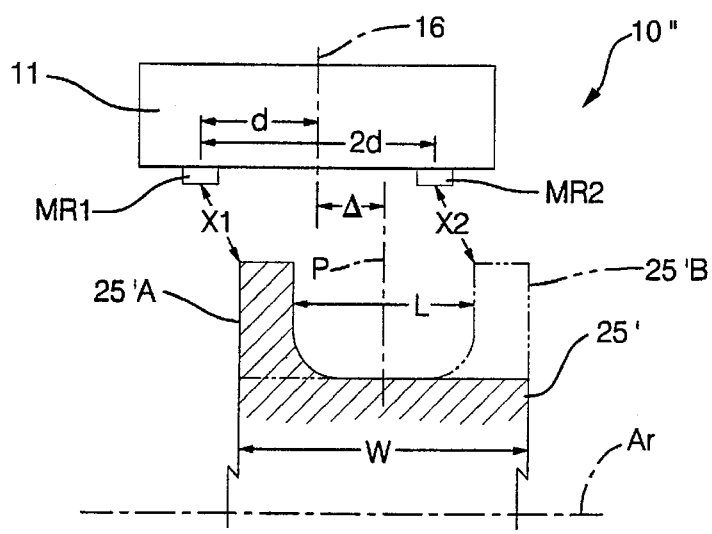

Referring now to FIG. 5A and 5B, a rotation sensor in accord with a second embodiment of the present invention is generally designated 10". Portions of the present sensor that are identical to portions of previously described sensors are similarly labeled in the present Figure and are to be understood to be fully described by previous descriptions.

Dual-element magnetoresistive (MR) sensor generally designated 11 cooperates with a rotating dual-track, target wheel generally designated 25'. Again, reference may be made to a single target wheel 25' or a pair of target wheels 25'A and 25'B which may be physically distinct or parts of a unitary structure as illustrated. Reference may be made to both target wheels 25'A and 25'B together as target wheel 25' or individually as target wheel 25'A or 25'B. In addition to the rotation sensor 10" accommodating the axial deviations of the crankshaft and target wheel to ensure operativeness of the sensor, the sensor furthermore ensures that the intersection angle of the respective MR outputs does not vary with the axial deviations. That is to say, the intersection of respective MR outputs is made angle invariant at all anticipated axial deviations by selectively choosing the various dimensions described such that the respective distances between each MR element and a radially aligned tooth of the corresponding track are equivalent for all axial deviations. In order that this be accomplished, the distance designated $x_1$ must be equivalent to the distance designated $x_2$, or $x_1 = x_2$. This relationship may be expressed as a further constraint on the MR spacing as follows: $2d = W/2 + L/2$.

Figure 6:
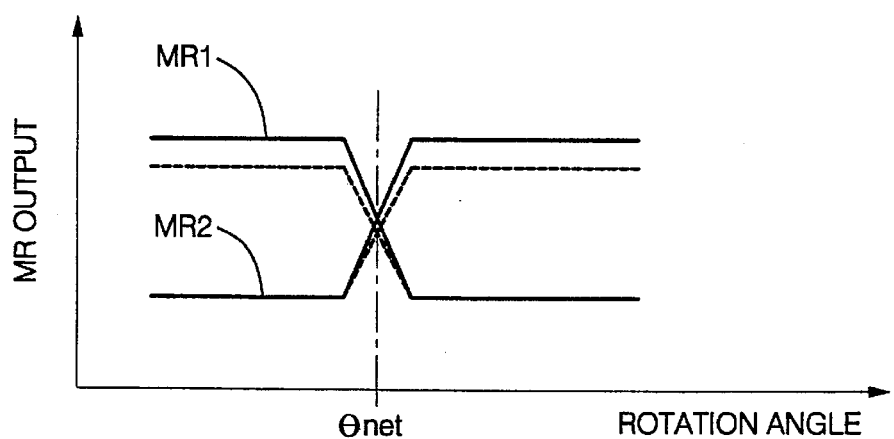

With a sensor meeting the geometrical limitations set forth above to ensure the intersection of MR outputs at equivalent average values, the actual angle of intersection will occur at the desired angle θnet is as shown in FIG. 6. Axial deviations to one side or the other of the sensor centerline will not cause the intersection angle to deviate from θnet. An examination of the FIGS. 5A and 5B yields an understanding that the distances $x_1$ and $x_2$ are minimum and equivalent at all axial displacements wherein the MR elements are above the respective tracks, and increase from the minimum, however remain equivalent to each other, when the axial displacement begins to move each MR element beyond the edge of the respective track. The MR outputs corresponding to the general case illustrated in FIG. 5A are shown as solid traces in FIG. 6, and the MR outputs corresponding to the general case illustrated in FIG. 5B are shown as broken traces in FIG. 6. It is noted that the MR output symmetry is maintained even at the extreme axial deviations.

Hence from the above,

| | FOR $x_1 < y_2$ | |
|---|---|---|
| IF $d \leq \Delta$ | | IF $d > \Delta$ |
| THEN $L > 2*(\Delta - d)$ and $W > 2*(\Delta + d)$ | | THEN $L > 4\Delta - W$ |
| OR $L > 2*(\Delta - d)$ and $L > 4\Delta - W$ | | |
| | FOR $x_1 = x_2$ | |
| | $2d = W/2 + L/2$ | |

From these general relationships, the designer is able to work within the constraints of the particular application (e.g. fixed or maximum target wheel width, available MR element spacing, etc.) to arrive at an acceptable set of complementary dimensions to ensure operability of the sensor throughout all axial deviations of the rotating member, and where desired a greater degree of angular accuracy.

It is, however, most desirable to provide a relationship among and between the components which ensures that even at maximum axial deviations the MR elements remain directly above the respective track as this will result in consistent output amplitudes over the range of axial deviations. Furthermore, it is most desirable to ensure that the only significant ferrite effects upon each MR element comes from the teeth of a corresponding track. Therefore, the distance L is understood to be wide enough to ensure that cross track ferrite effects upon the MR sensors when there is maximum axial displacement will have no substantial effect upon the respective MR low peak output. As such, the MR low peak outputs will remain substantially equivalent through all axial deviations. Additionally, where an implementation is such that the axial deviations may result in MR elements overhanging the respective tracks, it is desirable to set the depth of the groove between the tracks such that any ferrite effects therefrom match those imposed toward the outside tracks. This too will ensure that the respective MR low and high peak outputs will remain substantially equivalent through all axial deviations.

The preferred embodiment illustrated in FIGS. 5A and 5B may be fabricated with minimal machining operations by casting the sections generally corresponding to the individual tracks as either a single unitary structure using well known powder metal forging (PMF) operations or by casting the sections separately in similar PMF operations and later joining the sections such as during a sintering operation normally practiced on such PMF produced components. Of course, joining the target wheel to the engine crankshaft may require that the castings provide the necessary aperture through the rotational axis of the target wheel or additional machining operations post-sintering providing such provision. Low green strength would generally preclude significant machining operation prior to sintering. Alteratively, conventional stamping operations upon ferromagnetic sheet stock to provide the two general track sections and later joined in appropriate alignment.

Preferably, however, the embodiment is most readily produced as integral with the engine crankshaft. An engine crankshaft casting preferably is produced in conventional fashion with a dual target wheel blank on a portion thereof coaxial with the rotational axis. This process is a variation of well known crankshaft castings wherein a single track target wheel blank is cast into an appropriate portion thereof. Preferably, the casting may take the form of an annular blank supported by the crankshaft. A first grinding operation is performed to true the entire blank to the outer diameter of the teeth followed by material removal operations such as by rotary cutters. Generally, rotary cutters brought in from the side of the crankshaft would remove material to the desired depth to establish the groove in the center of the target wheel and the discontinuities. The rotary cutters therefore result in a fillet at the base of each tooth as shown in FIGS. 5A and 5B. Such manufacturing processes are generally well known.

The embodiments described and illustrated envision substantially solid ferromagnetic structures. However, the ferromagnetic target wheels may comprise non-magnetic hub members with one or more substantially annular ferromagnetic outer members secured thereto for providing the necessary toothed tracks. Therefore, it is to be understood that any such target wheel need only comprise ferromagnetic material in the portions having substantial influence upon the sensor operation.

While the invention has been described with respect to certain exemplary, preferred embodiments, it is understood that certain alterations thereto will be apparent to those having ordinary skill in the art and are intended to be encompassed by the scope of the invention as set forth in the appended claims.

We claim:
1. An apparatus for sensing rotation of an internal combustion engine crankshaft comprising:
   an engine crankshaft having an axis of rotation, said crankshaft characterized by a maximum axial displacement to either side of a net position within said engine,
   first and second target wheels fixably coupled to said crankshaft in axially spaced adjacency, each target wheel having a respective axial center and side edges, said first and second target wheels separated by a distance greater than four times the maximum axial displacement less the distance between respective axially opposite side edges;
   a dual-element magnetoresistive sensor having axially aligned first and second magnetoresistive elements separated by an axial distance corresponding substantially to the distance between said respective axial centers, said first magnetoresistive element corresponding to said first target wheel and substantially aligned therewith when said crankshaft is at said net position and said second magnetoresistive element corresponding to said second target wheel and substantially aligned therewith when said crankshaft is at said net position, each one of said first and second magnetoresistive elements having respective outputs which vary in accordance with magnetic flux density therethrough;
   said maximum axial displacement being less than one-half of the axial distance separating the magnetoresistive elements;
   said first and second target wheels characterized by alternating areas of high and low permeability as seen by the dual-element magnetoresistive sensor as the target wheels rotate with the crankshaft, each area of high permeability of said target wheel being substantially aligned with one of said areas of low permeability of said second target wheel, each area of low permeability of said target wheel being substantially aligned with one of said areas of high permeability of said second target wheel;
   whereby for axial displacements of the crankshaft the first target wheel is closer to the first magnetoresistive element than to the second magnetoresistive element and the second target wheel is closer to the second magnetoresistive element than to the first magnetoresistive element.

2. An apparatus for sensing rotation of an internal combustion engine crankshaft comprising:
   an engine crankshaft having an axis of rotation, said crankshaft characterized by a maximum axial displacement to either side of a net position within said engine;
   first and second target wheels fixably coupled to said crankshaft in axially spaced adjacency, each target wheel having a respective axial center and side edges;
   a dual-element magnetoresistive sensor having axially aligned first and second magnetoresistive elements separated by an axial distance corresponding substantially to the distance between said respective axial centers, said first magnetoresistive element corresponding to said first target wheel and substantially aligned therewith when said crankshaft is at said net position and said second magnetoresistive element corresponding to said second target wheel and substantially aligned therewith when said crankshaft is at said net position, each one of said first and second magnetoresistive elements having respective outputs which vary in accordance with magnetic flux density therethrough;

said first and second target wheels separated by a distance greater than twice the maximum axial displacement less the axial distance separating the magnetoresistive elements, and the distance between respective axially opposite side edges of the first and second target wheels is greater than twice the maximum axial displacement plus the distance separating the magnetoresistive elements;

said maximum axial displacement being not less than one-half of the axial distance separating the magnetoresistive elements;

said first and second target wheels characterized by alternating areas of high and low permeability as seen by the dual-element magnetoresistive sensor as the target wheels rotate with the crankshaft, each area of high permeability of said first target wheel being substantially aligned with one of said areas of high permeability of said second target wheel;

whereby for axial displacements of the crankshaft the first target wheel is closer to the first magnetoresistive element than to the second magnetoresistive element and the second target wheel is closer to the second magnetoresistive element than to the first magnetoresistive element.

3. An apparatus for sensing rotation of an internal combustion engine crankshaft comprising:

an engine crankshaft having an axis of rotation, said crankshaft characterized by a maximum axial displacement to either side of a net position within said engine;

first and second target wheels fixably coupled to said crankshaft in axially spaced adjacency, each target wheel having a respective axial center and side edges, said first and second target wheels separated by a distance greater than four times the maximum axial displacement less the distance between respective axially opposite side edges;

a dual-element magnetoresistive sensor having axially aligned first and second magnetoresistive elements separated by an axial distance corresponding substantially to the distance between said respective axial centers, said first magnetoresistive element corresponding to said first target wheel and substantially aligned therewith when said crankshaft is at said net position and said second magnetoresistive element corresponding to said second target wheel and substantially aligned therewith when said crankshaft is at said net position, each one of said first and second magnetoresistive elements having respective outputs which vary in accordance with magnetic flux density therethrough;

said maximum axial displacement from said net position being not less than onehalf of the axial distance separating the magnetoresistive elements;

said first and second target wheels separated by a distance greater than twice the maximum axial displacement less the distance separating the magnetoresistive elements;

said first and second target wheels characterized by alternating areas of high and low permeability as seen by the dual-element magnetoresistive sensor as the target wheels rotate with the crankshaft, each area of high permeability of said first target wheel being substantially aligned with one of said areas of low permeability of said second target wheel, each area of low permeability of said first-target wheel being substantially aligned with one of said areas of high permeability of said second target wheel;

whereby for axial displacements of the crankshaft the first target wheel is closer to the first magnetoresistive element than to the second magnetoresistive element and the second target wheel is closer to the second magnetoresistive element than to the first magnetoresistive element.

4. An apparatus for sensing rotation of an internal combustion engine crankshaft comprising:

an engine crankshaft having an axis of rotation, said crankshaft characterized by a maximum axial displacement to either side of a net position within said engine;

first and second target wheels fixably coupled to said crankshaft in axially spaced adjacency, each target wheel having a respective axial center and side edges, said first and second target wheels being separated by a distance greater than four times the maximum axial displacement less the distance between respective axially opposite side edges;

a dual-element magnetoresistive sensor having axially aligned first and second magnetoresistive elements separated by an axial distance corresponding substantially to the distance between said respective axial centers, said first magnetoresistive element corresponding to said first target wheel and separated therefrom by a respective distance and substantially aligned therewith when said crankshaft is at said net position and said second magnetoresistive element corresponding to said second target wheel and separated therefrom by a respective distance and substantially aligned therewith when said crankshaft is at said net position, each one of said first and second magnetoresistive elements having respective outputs which vary in accordance with magnetic flux density therethrough;

said maximum axial displacement from said net position being less than one-half of the axial distance separating the magnetoresistive elements, and twice the axial distance separating the magnetoresistive elements being substantially equivalent to the summation of the distance between respective axially opposite side edges and the distance separating the first and second target wheels;

said first and second target wheels characterized by alternating areas of high and low permeability as seen by the dual-element magnetoresistive sensor as the target wheels rotate with the crankshaft, each area of high permeability of said first target wheel being substantially aligned with one of said areas of low permeability of said second target wheel, each area of low permeability of said first target wheel being substantially aligned with one of said areas of high permeability of said second target wheel;

whereby for axial displacements of the crankshaft said respective distance between the first magnetoresistive element and the first target wheel is substantially equivalent to the respective distance between the second magnetoresistive element and the second target wheel, and the first target wheel is closer to the first magnetoresistive element than to the second magnetoresistive element and the second target wheel is closer to the second magnetoresistive element than to the first magnetoresistive element.

5. An apparatus for sensing rotation of an engine crankshaft about an axis as claimed in claim 3 further wherein the distance between respective axially opposite side edges is greater than twice the maximum axial displacement plus the distance separating the magnetoresistive elements.

* * * * *